United States Patent
Song et al.

(10) Patent No.: US 11,768,734 B2
(45) Date of Patent: Sep. 26, 2023

(54) POST ERROR CORRECTION CODE REGISTERS FOR CACHE METADATA

(71) Applicant: Micron Technology, Inc., Boise, ID (US)

(72) Inventors: Taeksang Song, San Jose, CA (US); Saira Samar Malik, Lafayette, IN (US); Chinnakrishnan Ballapuram, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/648,404

(22) Filed: Jan. 19, 2022

(65) Prior Publication Data

US 2023/0055293 A1 Feb. 23, 2023

Related U.S. Application Data

(60) Provisional application No. 63/234,015, filed on Aug. 17, 2021.

(51) Int. Cl.
*G06F 11/10* (2006.01)
*G06F 9/30* (2018.01)

(52) U.S. Cl.
CPC ...... *G06F 11/1064* (2013.01); *G06F 9/30101* (2013.01)

(58) Field of Classification Search
CPC .................. G06F 11/1064; G06F 9/30101
See application file for complete search history.

(56) References Cited

U.S. PATENT DOCUMENTS

| 2021/0081277 A1* | 3/2021 | Yang | G06F 11/1068 |
| 2021/0326068 A1* | 10/2021 | Li | H03M 13/05 |

\* cited by examiner

*Primary Examiner* — Thien Nguyen
(74) *Attorney, Agent, or Firm* — Holland & Hart LLP

(57) ABSTRACT

Methods, systems, and devices for post error correction code (ECC) registers for cache metadata are described. A device may read metadata from a memory array included in the device. The metadata may include information for operating a volatile memory as a cache for a non-volatile memory. The device may perform an ECC operation on the metadata based on reading the metadata from the memory array. After performing the ECC operation on the metadata, the device may write the metadata to a register that is coupled with the memory array. The device may then write the metadata from the register to the memory array.

25 Claims, 6 Drawing Sheets

POST ERROR CORRECTION CODE REGISTERS FOR CACHE METADATA

CROSS REFERENCE

The present application for patent claims the benefit of U.S. Provisional Patent Application No. 63/234,015 by SONG et al., entitled "POST ERROR CORRECTION CODE REGISTERS FOR CACHE METADATA," filed Aug. 17, 2021, assigned to the assignee hereof, and expressly incorporated by reference herein.

FIELD OF TECHNOLOGY

The following relates generally to one or more systems for memory and more specifically to post error correction code (ECC) registers for cache metadata.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state if disconnected from an external power source.

DETAILED DESCRIPTION

Figure 1:
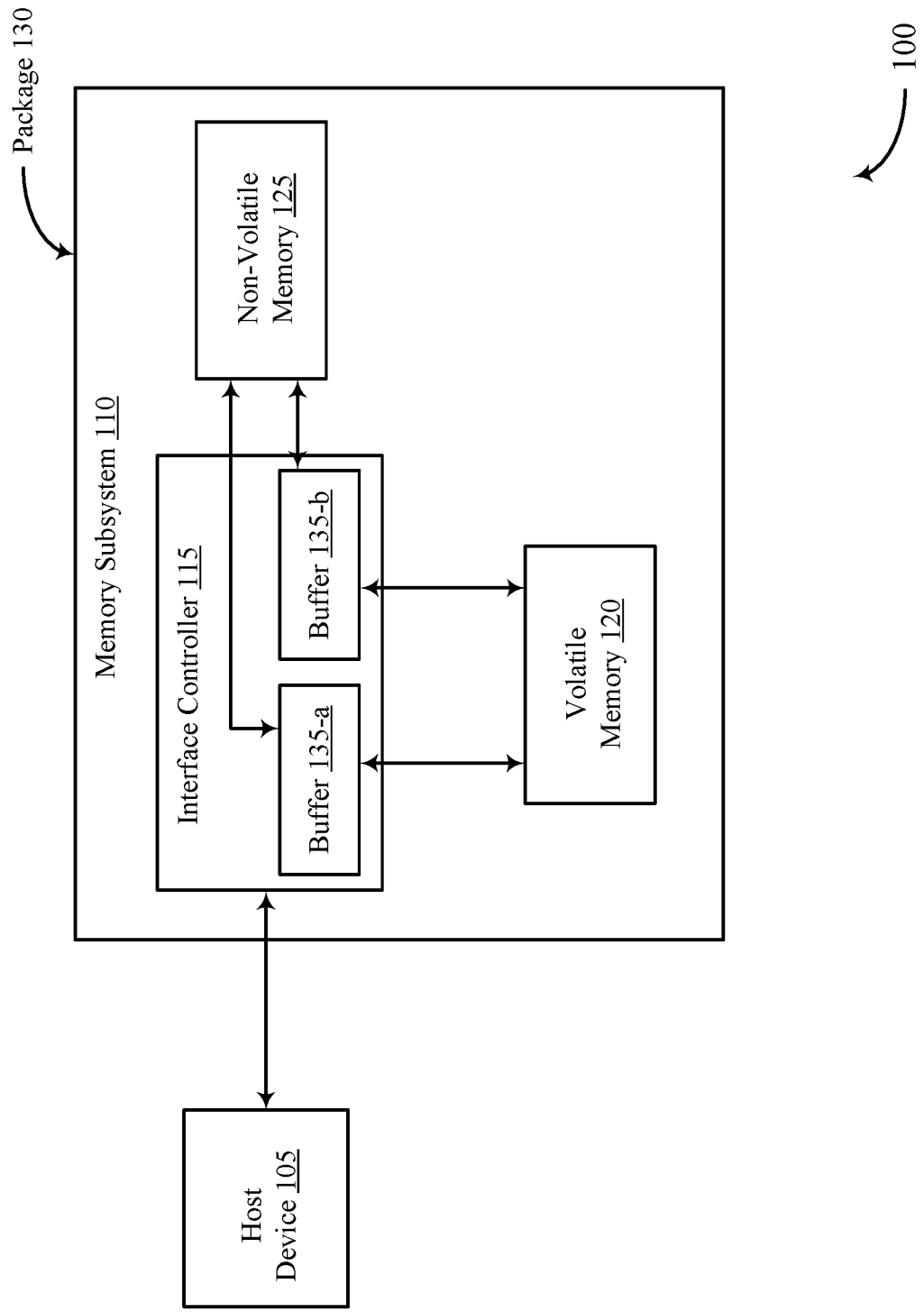
FIG. 1 illustrates an example of a system that supports post ECC registers for cache metadata in accordance with examples as disclosed herein.

A device, such as an electronic device, may include a non-volatile memory (e.g., a primary memory for storing information among other operations) and a volatile memory (e.g., a secondary memory) that may operate as a cache for the non-volatile memory. Such a configuration may allow the device to benefit from advantages of the non-volatile memory (e.g., non-volatility and persistent storage, high storage capacity, low power consumption) while maintaining compatibility with a host device through the volatile memory, among other aspects. To support this type of configuration, a device may include an interface controller that interfaces with the host device on behalf of the volatile memory and the non-volatile memory.

The interface controller may include a local array (e.g., a local memory array) that stores metadata for managing the volatile memory as a cache. If a command is received, the interface controller may read metadata associated with the command from the local array and perform error correction code (ECC) operations on the metadata to detect any errors in the metadata. If any errors in the metadata are detected, the interface controller may correct the errors and store the metadata back in the local array for future access. Thus, the interface controller may access metadata in the local array and perform ECC operations on a per-command basis. But accessing metadata in the local array and performing ECC operations on a per-command basis may result in frequent access of the local array and multiple, if not many, ECC operations, which may consume excess power, among other disadvantages.

According to the techniques described herein, a device or a component of a device, such as an interface controller, may reduce power consumption, among other advantages, by storing metadata from the local array in a register after performing ECC operations on the metadata. For example, the interface controller may read the metadata from the local array based on or in response to a first command (e.g., an activate command for a row of a bank of the volatile memory) and may store the metadata in the register (after performing the ECC operations) so that the metadata can be updated based on or in response to subsequent commands for the row without accessing the local array. The interface controller may store the metadata in the register for a duration, such as until a second command (e.g., a pre-charge command for the row) is received, at which point the interface controller may write the metadata from the register (e.g., after ECC encoding) to the local array. Thus, the interface controller may avoid accessing the local array many times (and performing ECC operations multiple times) for the same metadata, which may reduce power consumption, among other advantages.

Features of the disclosure are initially described in the context of a system and a memory subsystem described with reference to FIGS. 1 and 2. Features of the disclosure are described in the context of an interface controller as described with reference to FIG. 3, and a process flow, as described with reference to FIG. 4. These and other features of the disclosure are further illustrated by and described with reference to an apparatus diagram and flowcharts that relate to post ECC registers for cache metadata as described with reference to FIGS. 5 and 6.

FIG. 1 illustrates an example of a system 100 that supports post ECC registers for cache metadata in accordance with examples as disclosed herein. The system 100 may be included in an electronic device such a computer or phone. The system 100 may include a host device 105 and a memory subsystem 110. The host device 105 may be a processor or system-on-a-chip (SoC) that interfaces with the interface controller 115 as well as other components of the electronic device that includes the system 100. The memory subsystem 110 may store and provide access to electronic information (e.g., digital information, data) for the host device 105. The memory subsystem 110 may include an interface controller 115, a volatile memory 120, and a non-volatile memory 125. In some examples, the interface controller 115, the volatile memory 120, and the non-volatile memory 125 may be included in a same physical package such as a package 130. However, the interface controller 115, the volatile memory 120, and the non-volatile memory 125 may be disposed on different, respective dies (e.g., silicon dies).

The devices in the system 100 may be coupled by various conductive lines (e.g., traces, printed circuit board (PCB) routing, redistribution layer (RDL) routing) that may enable the communication of information (e.g., commands, addresses, data) between the devices. The conductive lines may make up channels, data buses, command buses, address buses, and the like.

The memory subsystem 110 may be configured to provide the benefits of the non-volatile memory 125 while maintaining compatibility with a host device 105 that supports protocols for a different type of memory, such as the volatile memory 120, among other examples. For example, the non-volatile memory 125 may provide benefits (e.g., relative to the volatile memory 120) such as non-volatility, higher capacity, or lower power consumption. But the host device 105 may be incompatible or inefficiently configured with various aspects of the non-volatile memory 125. For instance, the host device 105 may support voltages, access latencies, protocols, page sizes, etc. that are incompatible with the non-volatile memory 125. To compensate for the incompatibility between the host device 105 and the non-volatile memory 125, the memory subsystem 110 may be configured with the volatile memory 120, which may be compatible with the host device 105 and serve as a cache for the non-volatile memory 125. Thus, the host device 105 may use protocols supported by the volatile memory 120 while benefitting from the advantages of the non-volatile memory 125.

In some examples, the system 100 may be included in, or coupled with, a computing device, electronic device, mobile computing device, or wireless device. The device may be a portable electronic device. For example, the device may be a computer, a laptop computer, a tablet computer, a smartphone, a cellular phone, a wearable device, an internet-connected device, or the like. In some examples, the device may be configured for bi-directional wireless communication via a base station or access point. In some examples, the device associated with the system 100 may be capable of machine-type communication (MTC), machine-to-machine (M2M) communication, or device-to-device (D2D) communication. In some examples, the device associated with the system 100 may be referred to as a user equipment (UE), station (STA), mobile terminal, or the like.

The host device 105 may be configured to interface with the memory subsystem 110 using a first protocol (e.g., low-power double data rate (LPDDR)) supported by the interface controller 115. Thus, the host device 105 may, in some examples, interface with the interface controller 115 directly and the non-volatile memory 125 and the volatile memory 120 indirectly. In alternative examples, the host device 105 may interface directly with the non-volatile memory 125 and the volatile memory 120. The host device 105 may also interface with other components of the electronic device that includes the system 100. The host device 105 may be or include an SoC, a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In some examples, the host device 105 may be referred to as a host.

The interface controller 115 may be configured to interface with the volatile memory 120 and the non-volatile memory 125 on behalf of the host device 105 (e.g., based on or in response to one or more commands or requests issued by the host device 105). For instance, the interface controller 115 may facilitate the retrieval and storage of data in the volatile memory 120 and the non-volatile memory 125 on behalf of the host device 105. Thus, the interface controller 115 may facilitate data transfer between various subcomponents, such as between at least some of the host device 105, the volatile memory 120, or the non-volatile memory 125. The interface controller 115 may interface with the host device 105 and the volatile memory 120 using the first protocol and may interface with the non-volatile memory 125 using a second protocol supported by the non-volatile memory 125.

The non-volatile memory 125 may be configured to store digital information (e.g., data) for the electronic device that includes the system 100. Accordingly, the non-volatile memory 125 may include an array or arrays of memory cells and a local memory controller configured to operate the array(s) of memory cells. In some examples, the memory cells may be or include FeRAM cells (e.g., the non-volatile memory 125 may be FeRAM). The non-volatile memory 125 may be configured to interface with the interface controller 115 using the second protocol that is different than the first protocol used between the interface controller 115 and the host device 105. In some examples, the non-volatile memory 125 may have a longer latency for access operations than the volatile memory 120. For example, retrieving data from the non-volatile memory 125 may take longer than retrieving data from the volatile memory 120. Similarly, writing data to the non-volatile memory 125 may take longer than writing data to the volatile memory 120. In some examples, the non-volatile memory 125 may have a smaller page size than the volatile memory 120, as described herein.

The volatile memory 120 may be configured to operate as a cache for one or more components, such as the non-volatile memory 125. For example, the volatile memory 120 may store information (e.g., data) for the electronic device that includes the system 100. Accordingly, the volatile memory 120 may include an array or arrays of memory cells and a local memory controller configured to operate the array(s) of memory cells. In some examples, the memory cells may be or include DRAM cells (e.g., the volatile memory may be DRAM). The non-volatile memory 125 may be configured to interface with the interface controller 115 using the first protocol that is used between the interface controller 115 and the host device 105.

In some examples, the volatile memory 120 may have a shorter latency for access operations than the non-volatile memory 125. For example, retrieving data from the volatile memory 120 may take less time than retrieving data from the non-volatile memory 125. Similarly, writing data to the volatile memory 120 may take less time than writing data to the non-volatile memory 125. In some examples, the volatile memory 120 may have a larger page size than the non-volatile memory 125. For instance, the page size of volatile memory 120 may be 2 kilobytes (2 kB) and the page size of non-volatile memory 125 may be 64 bytes (64B) or 128 bytes (128B).

Although the non-volatile memory 125 may be a higher-density memory than the volatile memory 120, in some examples, accessing the non-volatile memory 125 may take longer than accessing the volatile memory 120 (e.g., due to different architectures and protocols, among other reasons). Accordingly, operating the volatile memory 120 as a cache may reduce latency in the system 100. As an example, an access request for data from the host device 105 may be satisfied relatively quickly by retrieving the data from the volatile memory 120 rather than from the non-volatile memory 125. To facilitate operation of the volatile memory 120 as a cache, the interface controller 115 may include multiple buffers 135. The buffers 135 may be disposed on the same die as the interface controller 115 and may be configured to temporarily store data for transfer between the volatile memory 120, the non-volatile memory 125, or the host device 105 (or any combination thereof) during one or more access operations (e.g., storage and retrieval operations).

An access operation may also be referred to as an access process or access procedure and may involve one or more sub-operations that are performed by one or more of the components of the memory subsystem 110. Examples of access operations may include storage operations in which data provided by the host device 105 is stored (e.g., written to) in the volatile memory 120 or the non-volatile memory 125 (or both), and retrieval operations in which data requested by the host device 105 is obtained (e.g., read) from the volatile memory 120 or the non-volatile memory 125 and is returned to the host device 105.

To store data in the memory subsystem 110, the host device 105 may transmit a write command (also referred to as a write request, a storage command, or a storage request) to the interface controller 115. The write command may include or be accompanied by a memory address that targets a location (e.g., a set of cells) in the non-volatile memory 125. In some examples, a set of memory cells may also be referred to as a portion of memory. The host device 105 may also provide the data to be written. The interface controller 115 may temporarily store the data in the buffer 135-a. After storing the data in the buffer 135-a, the interface controller 115 may transfer the data from the buffer 135-a to the volatile memory 120 or the non-volatile memory 125 or both. In write-through mode, the interface controller 115 may transfer the data to both the volatile memory 120 and the non-volatile memory 125. In write-back mode, the interface controller 115 may simply transfer the data to the volatile memory 120 (with the data being transferred to the non-volatile memory 125 during a later eviction process).

In either mode, the interface controller 115 may identify an appropriate location (e.g., set of volatile memory cells) in the volatile memory 120 for storing the data associated with the write command. To do so, the interface controller 115 may implement set-associative mapping in which addresses of the non-volatile memory 125 are mapped to multiple addresses of the volatile memory 120. For instance, the interface controller 115 may implement n-way associative mapping which allows data from (or for) an address (e.g., location, set of non-volatile memory cells) of the non-volatile memory 125 to be stored at one of n addresses (e.g., locations, sets of volatile memory cells, cache blocks) of the volatile memory 120, where the n addresses may collectively be referred to as a set. Thus, the interface controller 115 may manage the volatile memory 120 as a cache for the non-volatile memory 125 by referencing the set of n addresses the volatile memory 120 associated with a targeted address. Although described with reference to set-associative mapping, the interface controller 115 may manage the volatile memory 120 as a cache by implementing one or more other types of mapping such as direct mapping or associative mapping, among other examples.

After determining which set of n addresses is associated with the targeted non-volatile address, the interface controller 115 may store the data at one of the n addresses in the set. This way, a subsequent (e.g., following) read command from the host device 105 for the data can be efficiently satisfied by retrieving the data from the lower-latency volatile memory 120 instead of retrieving the data from the higher-latency non-volatile memory 125. Thus, a write command by the host device 105 may be wholly (e.g., in write-back mode) or partially (e.g., in write-through mode) satisfied by storing the data in the volatile memory 120. To track the data stored in the volatile memory 120, the interface controller 115 may use tag addresses that indicate which data is stored at different addresses of the volatile memory 120.

To retrieve data from the memory subsystem 110, the host device 105 transmit a read command (also referred to as a read request, a retrieval command, or a retrieval request) to the interface controller 115. The read command may target an address of the non-volatile memory 125. Upon receiving the read command, the interface controller 115 may check for the requested data in the volatile memory 120. For instance, the interface controller 115 may check whether the requested data is stored at one of the n addresses associated with the targeted non-volatile memory address. If the data is stored at one of the n addresses, the interface controller 115 may transfer the data from the volatile memory 120 to the buffer 135-a so that it can be transmitted to the host device 105. In general, the term "hit" may be used to refer to the scenario where the volatile memory 120 stores data targeted by the host device 105.

If the volatile memory 120 does not store the requested data, the interface controller 115 may transfer the requested data from the non-volatile memory 125 to the buffer 135-a so that it can be transmitted to the host device 105. In general, the term "miss" may be used to refer to the scenario where the volatile memory 120 does not store data targeted by the host device 105. In a miss scenario, after transferring the requested data to the buffer 135-a, the interface controller 115 may transfer the requested data from the buffer 135-a to the volatile memory 120 so that subsequent read requests for the data can be satisfied by the volatile memory 120 instead of the non-volatile memory 125. For example, the interface controller 115 may store the data at one of the n addresses in the set associated with the targeted non-volatile memory address. If the n addresses are already storing other data, the interface controller 115 may transfer the other data to the buffer 135-b so that it can be transferred to the non-volatile memory 125 for storage. Such a process may be referred to as "eviction" and the data transferred from the volatile memory 120 to the buffer 135-b may be referred to as "victim" data.

In some cases, the interface controller 115 may transfer a subset of the victim data from the buffer 135-b to the non-volatile memory 125. For example, the interface controller 115 may transfer one or more subsets of victim data that have changed since the data was initially stored in the non-volatile memory 125. Data that is inconsistent between the volatile memory 120 and the non-volatile memory 125 (e.g., due to an update in one memory and not the other) may be referred to in some cases as "modified" or "dirty" data. In some examples (e.g., if interface controller operates in one mode such as a write-back mode), dirty data may be data that is present in the volatile memory 120 but not present in the non-volatile memory 125.

So, the interface controller 115 may perform an eviction procedure to save data from the volatile memory 120 to the non-volatile memory 125 if the volatile memory 120 is full (e.g., to make space for new data in the volatile memory 120). In some examples, the interface controller 115 may perform a "fill" procedure in which data from the non-volatile memory 125 is saved to the volatile memory 120. The interface controller 115 may perform a fill procedure in the event of a miss (e.g., to populate the volatile memory 120 with relevant data). For example, in the event of a read miss, which occurs if a read command from the host device 105 targets data stored in the non-volatile memory 125 instead of the volatile memory 120, the interface controller 115 may retrieve (from the non-volatile memory 125) the data requested by the read command and, in addition to returning the data to the host device, store the data in the volatile memory 120 (e.g., so that the data can be retrieved quickly in the future).

Thus, the memory subsystem 110 may satisfy (or "fulfill") requests (e.g., read commands, write commands) from the host device 105 using either the volatile memory 120 or the non-volatile memory 125, depending on the hit or miss status of the request. For example, in the event of a read miss, the read command from the host device 105 may be satisfied by the non-volatile memory 125, which means that the data returned from the host device 105 may originate from the non-volatile memory 125. And in the event of a read hit, the read command from the host device 105 may be satisfied by the volatile memory 120, which means that the data returned from the host device 105 may originate from the volatile memory 120. In some examples, the ratio of hits to misses ("hit-to-miss ratio") may be relatively high (e.g., the hit percentage (or "hit rate") may be around 85% whereas the miss percentage (or "miss rate") may be around 15%).

The system 100 may include any quantity of non-transitory computer readable media that support quality-of-service information as described herein. For example, the host device 105, the interface controller 115, the volatile memory 120, or the non-volatile memory 125 may include or otherwise may access one or more non-transitory computer readable media storing instructions (e.g., firmware) for performing the functions ascribed herein to the host device 105, the interface controller 115, the volatile memory 120, or the non-volatile memory 125. For example, such instructions, if executed by the host device 105 (e.g., by a host device controller), by the interface controller 115, by the volatile memory 120 (e.g., by a local controller), or by the non-volatile memory 125 (e.g., by a local controller), may cause the host device 105, the interface controller 115, the volatile memory 120, or the non-volatile memory 125 to perform associated functions as described herein.

In some examples, the interface controller 115 may include a local array that stores metadata for operating the volatile memory 120 as a cache for the non-volatile memory 125. For example, the local array may store tag information (e.g., tag addresses) that indicates which data is stored in the volatile memory 120, dirty information (also referred to as dirty bits or dirty flags) that indicates whether data stored in the volatile memory 120 is also stored in the non-volatile memory 125, and validity information that indicates whether data stored in the volatile memory 120 is valid, among other types of metadata.

To improve the reliability of metadata stored in the local array, the interface controller 115 may implement ECC protection, which may involve ECC-encoding metadata before storing the metadata in the local array and ECC-decoding metadata before using the metadata to manage cache operations. For example, if a command is received from the host device 105, the interface controller may read metadata associated with the command from the local array, perform ECC decoding on the metadata, correct any detected errors in the metadata, perform ECC encoding on the metadata, and store the metadata back in the local array. Such a technique may ensure that only corrected metadata is stored in the local array. However, such a technique may result in frequent access of the local array (e.g., because the local array may be accessed multiple times for commands associated with the same metadata) and multiple ECC operations, which may negatively impact the performance of the interface controller 115.

According to the techniques described herein, the interface controller 115 may reduce access to the local array by storing metadata for a row in a register in between activate and precharge commands for the row. The interface controller 115 may update the metadata while the metadata is stored in the register, which may reduce access to the local array and decrease the quantity of ECC operations performed by the interface controller 115. Accessing the local array may consume more power than accessing the register; and performing ECC operations may also consume non-trivial amounts of power. Thus, the techniques described herein may enable the interface controller 115 to reduce power consumption related to metadata management.

Figure 2:
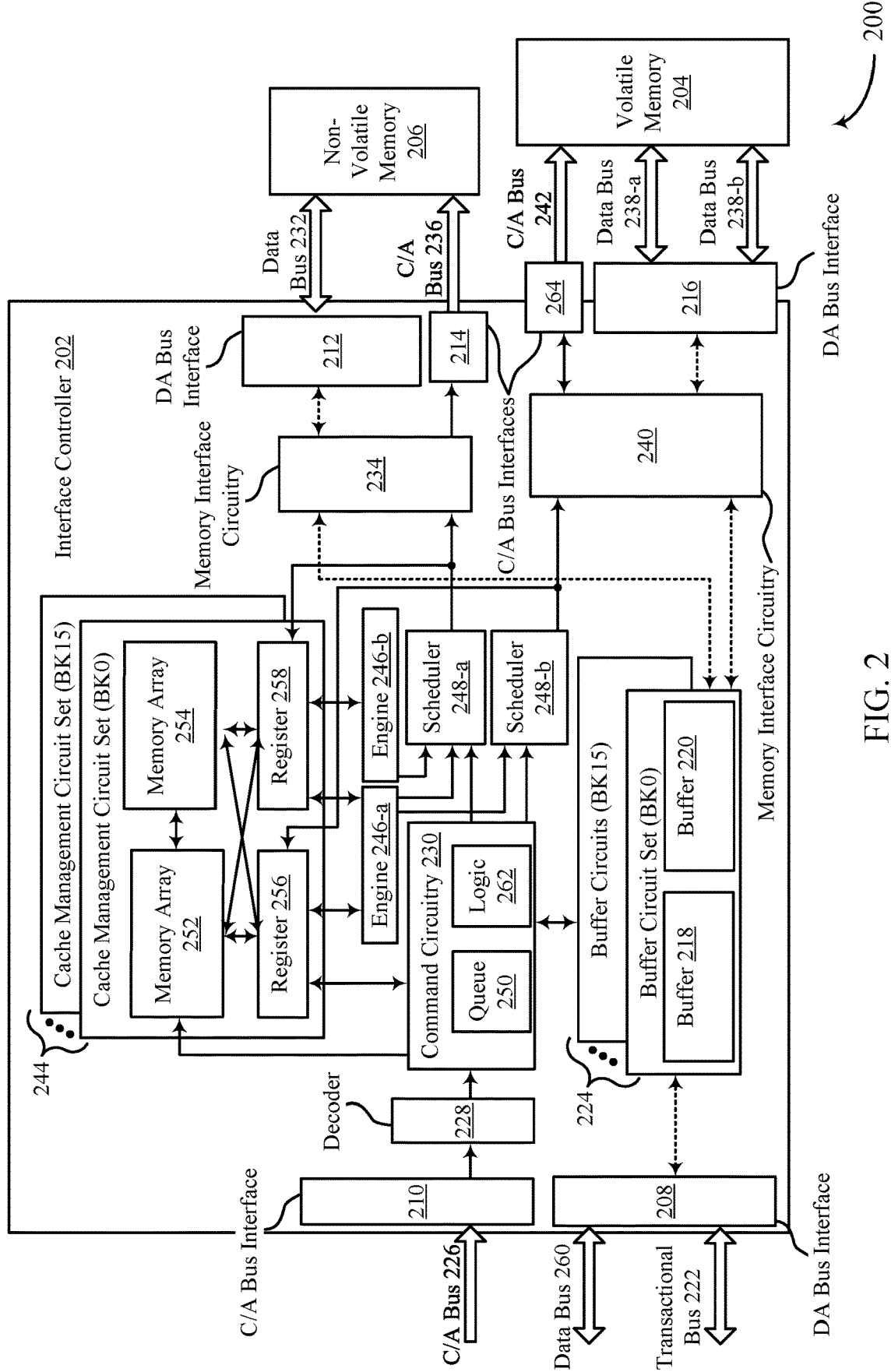
FIG. 2 illustrates an example of a memory subsystem that supports post ECC registers for cache metadata in accordance with examples as disclosed herein.

FIG. 2 illustrates an example of a memory subsystem 200 that supports post ECC registers for cache metadata in accordance with examples as disclosed herein. The memory subsystem 200 may be an example of the memory subsystem 110 described with reference to FIG. 1. Accordingly, the memory subsystem 200 may interact with a host device as described with reference to FIG. 1. The memory subsystem 200 may include an interface controller 202, a volatile memory 204, and a non-volatile memory 206, which may be examples of the interface controller 115, the volatile memory 120, and the non-volatile memory 125, respectively, as described with reference to FIG. 1. Thus, the interface controller 202 may interface with the volatile memory 204 and the non-volatile memory 206 on behalf of the host device as described with reference to FIG. 1. For example, the interface controller 202 may operate the volatile memory 204 as a cache for the non-volatile memory 206. Operating the volatile memory 204 as the cache may allow subsystem to provide the benefits of the non-volatile memory 206 (e.g., non-volatile, high-density storage) while maintaining compatibility with a host device that supports a different protocol than the non-volatile memory 206.

In FIG. 2, dashed lines between components represent the flow of data or communication paths for data and solid lines between components represent the flow of commands or communication paths for commands. In some cases, the memory subsystem 200 is one of multiple similar or identical subsystems that may be included in an electronic device. Each subsystem may be referred to as a slice and may be associated with a respective channel of a host device in some examples.

The non-volatile memory 206 may be configured to operate as a main memory (e.g., memory for long-term data storage) for a host device. In some cases, the non-volatile memory 206 may include one or more arrays of FeRAM cells. Each FeRAM cell may include a selection component and a ferroelectric capacitor and may be accessed by applying appropriate voltages to one or more access lines such as word lines, plates lines, and digit lines. In some examples, a subset of FeRAM cells coupled with to an activated word line may be sensed, for example concurrently or simultaneously, without having to sense all FeRAM cells coupled with the activated word line. Accordingly, a page size for an FeRAM array may be different than (e.g., smaller than) a DRAM page size. In the context of a memory device, a page may refer to the memory cells in a row (e.g., a group of the memory cells that have a common row address) and a page size may refer to the quantity of memory cells or column addresses in a row, or the quantity of column addresses accessed during an access operation. Alternatively, a page size may refer to a size of data handled by various interfaces or the amount of data a row is capable of storing. In some cases, different memory device types may have different page sizes. For example, a DRAM page size (e.g., 2 kB) may be a superset of a non-volatile memory (e.g., FeRAM) page size (e.g., 64B).

A smaller page size of an FeRAM array may provide various efficiency benefits, as an individual FeRAM cell may need more power to read or write than an individual DRAM cell. For example, a smaller page size for an FeRAM array may facilitate effective energy usage because a smaller quantity of FeRAM cells may be activated if an associated change in information is minor. In some examples, the page size for an array of FeRAM cells may vary, for example dynamically (e.g., during operation of the array of FeRAM cells) depending on the nature of data and command utilizing FeRAM operation.

Although an individual FeRAM cell may need more power to read or write than an individual DRAM cell, an FeRAM cell may maintain a stored logic state for an extended period of time in the absence of an external power source, as the ferroelectric material in the FeRAM cell may maintain a non-zero electric polarization in the absence of an electric field. Therefore, including an FeRAM array in the non-volatile memory 206 may provide power and efficiency benefits relative to volatile memory cells (e.g., DRAM cells in the volatile memory 204), as it may reduce or eliminate constraints to perform refresh operations.

The volatile memory 204 may be configured to operate as a cache for the non-volatile memory 206. In some cases, the volatile memory 204 may include one or more arrays of DRAM cells. Each DRAM cell may include a capacitor that includes a dielectric material to store a charge representative of the programmable state. The memory cells of the volatile memory 204 may be logically grouped or arranged into one or more memory banks (as referred to herein as "banks"). For example, volatile memory 204 may include sixteen banks. The memory cells of a bank may be arranged in a grid or an array of intersecting columns and rows and each memory cell may be accessed or refreshed by applying appropriate voltages to the digit line (e.g., column line) and word line (e.g., row line) for that memory cell. The rows of a bank may be referred to pages, and the page size may refer to the quantity of columns or memory cells in a row (and thus, the amount of data a row is capable of storing). As noted, the page size of the volatile memory 204 may be different than (e.g., larger than) the page size of the non-volatile memory 206.

The interface controller 202 may include various circuits for interfacing (e.g., communicating) with other devices, such as a host device, the volatile memory 204, and the non-volatile memory 206. For example, the interface controller 202 may include a data (DA) bus interface 208, a command and address (C/A) bus interface 210, a data bus interface 212, a C/A bus interface 214, a data bus interface 216, and a C/A bus interface 264. The data bus interfaces may support the communication of information using one or more communication protocols. For example, the data bus interface 208, the C/A bus interface 210, the data bus interface 216, and the C/A bus interface 264 may support information that is communicated using a first protocol (e.g., LPDDR signaling), whereas the data bus interface 212 and the C/A bus interface 214 may support information communicated using a second protocol. Thus, the various bus interfaces coupled with the interface controller 202 may support different amounts of data or data rates.

The data bus interface 208 may be coupled with the data bus 260, the transactional bus 222, and the buffer circuitry 224. The data bus interface 208 may be configured to transmit and receive data over the data bus 260 and control information (e.g., acknowledgements/negative acknowledgements) or metadata over the transactional bus 222. The data bus interface 208 may also be configured to transfer data between the data bus 260 and the buffer circuitry 224. The data bus 260 and the transactional bus 222 may be coupled with the interface controller 202 and the host device such that a conductive path is established between the interface controller 202 and the host device. In some examples, the pins of the transactional bus 222 may be referred to as data mask inversion (DMI) pins. Although shown with one data bus 260 and one transactional bus 222, there may be any quantity of data buses 260 and any quantity of transactional buses 222 coupled with one or more data bus interfaces 208.

The C/A bus interface 210 may be coupled with the C/A bus 226 and the decoder 228. The C/A bus interface 210 may be configured to transmit and receive commands and addresses over the C/A bus 226. The commands and addresses received over the C/A bus 226 may be associated with data received or transmitted over the data bus 260. The C/A bus interface 210 may also be configured to transmit commands and addresses to the decoder 228 so that the decoder 228 can decode the commands and relay the decoded commands and associated addresses to the command circuitry 230.

The data bus interface 212 may be coupled with the data bus 232 and the memory interface circuitry 234. The data bus interface 212 may be configured to transmit and receive data over the data bus 232, which may be coupled with the non-volatile memory 206. The data bus interface 212 may also be configured to transfer data between the data bus 232 and the memory interface circuitry 234. The C/A bus interface 214 may be coupled with the C/A bus 236 and the memory interface circuitry 234. The C/A bus interface 214 may be configured to receive commands and addresses from the memory interface circuitry 234 and relay the commands and the addresses to the non-volatile memory 206 (e.g., to a local controller of the non-volatile memory 206) over the C/A bus 236. The commands and the addresses transmitted over the C/A bus 236 may be associated with data received or transmitted over the data bus 232. The data bus 232 and the C/A bus 236 may be coupled with the interface controller 202 and the non-volatile memory 206 such that conductive paths are established between the interface controller 202 and the non-volatile memory 206.

The data bus interface 216 may be coupled with the data buses 238 (e.g., data bus 238-a, data bus 238-b) and the memory interface circuitry 240. The data bus interface 216 may be configured to transmit and receive data over the data buses 238, which may be coupled with the volatile memory 204. The data bus interface 216 may also be configured to transfer data between the data buses 238 and the memory interface circuitry 240. The C/A bus interface 264 may be coupled with the C/A bus 242 and the memory interface circuitry 240. The C/A bus interface 264 may be configured to receive commands and addresses from the memory interface circuitry 240 and relay the commands and the addresses to the volatile memory 204 (e.g., to a local controller of the volatile memory 204) over the C/A bus 242. The commands and addresses transmitted over the C/A bus 242 may be associated with data received or transmitted over the data buses 238. The data bus 238 and the C/A bus 242 may be coupled with the interface controller 202 and the volatile memory 204 such that conductive paths are established between the interface controller 202 and the volatile memory 204.

In addition to buses and bus interfaces for communicating with coupled devices, the interface controller 202 may include circuitry for operating the non-volatile memory 206 as a main memory and the volatile memory 204 as a cache. For example, the interface controller 202 may include command circuitry 230, buffer circuitry 224, cache management circuitry 244, one or more engines 246, and one or more schedulers 248.

The command circuitry 230 may be coupled with the buffer circuitry 224, the decoder 228, the cache management circuitry 244, and the schedulers 248, among other components. The command circuitry 230 may be also be referred to as a controller and may be configured to manage commands for the volatile memory and commands for the non-volatile memory. The command circuitry 230 may be configured to receive command and address information from the decoder 228 and store the command and address information in the queue 250. The command circuitry 230 may include logic 262 that processes command information (e.g., from a host device) and metadata from other components (e.g., the cache management circuitry 244, the buffer circuitry 224) and uses that information to generate one or more commands for the schedulers 248. The command circuitry 230 may also be configured to transfer address information (e.g., address bits) to the cache management circuitry 244. In some examples, the logic 262 may be a circuit configured to operate as a finite state machine (FSM).

The buffer circuitry 224 may be coupled with the data bus interface 208, the command circuitry 230, the memory interface circuitry 234, and the memory interface circuitry 234. The buffer circuitry 224 may include a set of one or more buffer circuits for at least some banks, if not each bank, of the volatile memory 204. The buffer circuitry 224 may also include components (e.g., a memory controller) for accessing the buffer circuits. In one example, the volatile memory 204 may include sixteen banks and the buffer circuitry 224 may include sixteen sets of buffer circuits. Each set of the buffer circuits may be configured to store data from or for (or both) a respective bank of the volatile memory 204. As an example, the buffer circuit set for bank 0 (BK0) may be configured to store data from or for (or both) the first bank of the volatile memory 204 and the buffer circuit for bank 15 (BK15) may be configured to store data from or for (or both) the sixteenth bank of the volatile memory 204.

Each set of buffer circuits in the buffer circuitry 224 may include a pair of buffers. The pair of buffers may include one buffer (e.g., an open page data (OPD) buffer) configured to store data targeted by an access command (e.g., a write command or read command) from the host device and another buffer (e.g., a victim page data (VPD) buffer) configured to store data for an eviction process that results from the access command. For example, the buffer circuit set for BK0 may include the buffer 218 and the buffer 220, which may be examples of buffer 135-a and 135-b, respectively. The buffer 218 may be configured to store BK0 data that is targeted by an access command from the host device. And the buffer 220 may be configured to store data that is transferred from BK0 as part of an eviction process triggered by the access command. Each buffer in a buffer circuit set may be configured with a size (e.g., storage capacity) that corresponds to a page size of the volatile memory 204. For example, if the page size of the volatile memory 204 is 2 kB, the size of each buffer may be 2 kB. Thus, the size of the buffer may be equivalent to the page size of the volatile memory 204 in some examples.

The cache management circuitry 244 may be coupled with the command circuitry 230, the engines 246, and the schedulers 248, among other components. The cache management circuitry 244 may include a cache management circuit set for one or more banks (e.g., each bank) of volatile memory. As an example, the cache management circuitry 244 may include sixteen cache management circuit sets for BK0 through BK15. Each cache management circuit set may include two memory arrays that may be configured to store metadata for the volatile memory 204. As an example, the cache management circuit set for BK0 may include a memory array 252 (e.g., a Cache DRAM (CDRAM) Tag Array (CDT-TA)) and a memory array 254 (e.g., a CDRAM Valid (CDT-V) array), which may be configured to store metadata for BK0. In some examples, the memory arrays for multiple banks (e.g., two banks) may be combined and referred to as a group or a chunk. The memory arrays may also be referred to as arrays, local arrays, or buffers, among other suitable terminology. In some cases, the memory arrays may be or include volatile memory cells, such as static RAM (SRAM) cells. However, the memory arrays are not limited to SRAM.

Metadata (or "access information") may include tag information, validity information, or dirty information (or any combination thereof) associated with the volatile memory 204, among other examples. Tag information (e.g., tag addresses) may indicate which data is stored at an address of the volatile memory 204. For example, the tag information for an address of the volatile memory 204 may indicate the non-volatile memory address associated with the data stored at that address of the volatile memory 204. As noted, validity information may indicate whether the data stored in the volatile memory 204 is actual data (e.g., data having an intended order or form) or placeholder data (e.g., data being random or dummy, not having an intended or important order). And dirty information may indicate whether the data stored in the volatile memory 204 is different than corresponding data stored in the non-volatile memory 206. For example, dirty information may indicate whether data stored in the volatile memory 204 has been updated relative to data stored in the non-volatile memory 206.

A memory array 252 may be an example of a local array and may include memory cells that store metadata (e.g., tag information, validity information, dirty information) for one or more associated banks of the volatile memory 204. The memory array 252 may also be referred to as a tag memory array or tag memory. The metadata in a memory array 252 may be stored on a per-row basis (e.g., there may be respective metadata for each row of the associated volatile memory bank(s)). The interface controller 202 may check for requested data in the volatile memory 204 by referencing the metadata in the memory array 252. For instance, the interface controller 202 may receive, from a host device, a read command for data that is associated with an address of the non-volatile memory 206. The interface controller 202 may use a subset of the address bits to reference the metadata in the memory array 252. For instance, using set-associative mapping, the interface controller 202 may use a first subset of address bits to determine which set of n addresses is associated with the data, and may use a second subset of address bits to determine whether any of the n addresses in the set stores the data.

In addition to storing tag information, the memory array 252 may also store validity information that indicates whether the data in the volatile memory 204 is actual data (also referred to as valid data) or random data (also referred to as invalid data). For example, the volatile memory 204 may initially store random data and continue to do so until the volatile memory cells are written with data from a host device or the non-volatile memory 206. To track which data is valid, the memory array 252 may be configured to set a bit for a set (e.g., row) of volatile memory cells if actual data is stored in that set of volatile memory cells. This bit may be referred to a validity bit or a validity flag. As with the tag information, the validity information stored in the memory array 252 may be stored on a per-row basis. Thus, each validity bit may indicate the validity of data stored in an associated row in some examples. In some examples, the memory array 252 may also store dirty information that indicates whether a set (e.g., row) of volatile memory cells stores any dirty data. Like the validity information, the dirty information stored in the memory array 252 may be stored on a per-row basis.

A memory array 254 may also be an example of a local array. The memory array 254 may also be referred to as a data memory array or data memory. A memory array 254 may be similar to the memory array 252 and may also include memory cells that store metadata for one or more banks of the volatile memory 204 that is associated with the memory array 252. For example, a memory array 254 may store validity information and dirty information for one or more banks of the volatile memory 204. However, the metadata stored in the memory array 254 may be stored on a sub-block basis as opposed to a per-row basis. For example, the validity information stored in the memory cells of the memory array 254 may indicate the validity of data for subsets of volatile memory cells in a row of the volatile memory 204.

Thus, in some examples, metadata in a memory array 252 may be stored on a per-row basis (e.g., for 2 kB of data) and metadata in a memory array 252 may be stored on a per-sub-block basis (e.g., for 64B of data). To illustrate, the validity information in a memory array 254 may indicate the validity of each subset (e.g., 32B or 64B) of data stored in row of the volatile memory 204. Similarly, the dirty information stored in the memory array 254 may indicate which subsets of volatile memory cells in the row of the volatile memory 204 store dirty data. Storing metadata (e.g., tag information, validity information, dirty information) on a per-row basis in a memory array 252 may allow the interface controller 202 to determine whether there is a hit or a miss for data in the volatile memory 204. Storing metadata (e.g., validity information, dirty information) on a sub-block basis in a memory array 254 may allow the interface controller 202 to determine which one or more subsets of data to return to the host device (e.g., during a read process) and which one or more subsets of data to preserve in the non-volatile memory 206 (e.g., during an eviction process).

Each cache management circuit set may also include a respective pair of registers coupled with the command circuitry 230, the engines 246, the memory interface circuitry 234, the memory interface circuitry 240, and the memory arrays for that cache management circuit set, among other components. For example, a cache management circuit set may include a first register (e.g., a register 256 which may be an open page tag (OPT) register) configured to receive metadata (e.g., one or more bits of tag information, validity information, or dirty information, other information, or any combination) from the memory array 252 or the scheduler 248-b or both. The cache management circuitry set may also include a second register (e.g., a register 258 which may be a victim page tag (VPT) register) configured to receive metadata (e.g., validity information or dirty information or both) from the memory array 254 and the scheduler 248-a or both. The information in the register 256 and the register 258 may be transferred to the command circuitry 230 and the engines 246 to enable decision-making by these components. For example, the command circuitry 230 may issue commands for reading the non-volatile memory 206 or the volatile memory 204 based on or in response to metadata in the register 256, or the register 258, or both.

The engine 246-a may be coupled with the register 256, the register 258, and the schedulers 248. The engine 246-a may be configured to receive metadata from various components and issue commands to the schedulers 248 based on or in response to the metadata. For example, if the interface controller 202 is in a first mode such as a write-through mode, the engine 246-a may issue commands to the scheduler 248-b and in response the scheduler 248-b to initiate or facilitate the transfer of data from the buffer 218 to both the volatile memory 204 and the non-volatile memory 206. Alternatively, if the interface controller 202 is in a second mode such as a write-back mode, the engine 246-a may issue commands to the scheduler 248-b and in response the scheduler 248-b may initiate or facilitate the transfer of data from the buffer 218 to the volatile memory 204. In the event of a write-back operation, the data stored in the volatile memory 204 may eventually be transferred to the non-volatile memory 206 during a subsequent (e.g., following) eviction process.

The engine 246-b may be coupled with the register 258 and the scheduler 248-a. The engine 246-b may be configured to receive metadata from the register 258 and issue commands to the scheduler 248-a based on or in response to the metadata. For instance, the engine 246-b may issue commands to the scheduler 248-a to initiate or facilitate transfer of dirty data from the buffer 220 to the non-volatile memory 206 (e.g., as part of an eviction process). If the buffer 220 holds a set of data transferred from the volatile memory 204 (e.g., victim data), the engine 246-b may indicate which one or more subsets (e.g., which 64B) of the set of data in the buffer 220 should be transferred to the non-volatile memory 206.

The scheduler 248-a may be coupled with various components of the interface controller 202 and may facilitate accessing the non-volatile memory 206 by issuing commands to the memory interface circuitry 234. The commands issued by the scheduler 248-a may be based on or in response to commands from the command circuitry 230, the engine 246-*a*, the engine 246-*b*, or a combination of these components. Similarly, the scheduler 248-*b* may be coupled with various components of the interface controller 202 and may facilitate accessing the volatile memory 204 by issuing commands to the memory interface circuitry 240. The commands issued by the scheduler 248-*b* may be based on or in response to commands from the command circuitry 230 or the engine 246-*a*, or both.

The memory interface circuitry 234 may communicate with the non-volatile memory 206 via one or more of the data bus interface 212 and the C/A bus interface 214. For example, the memory interface circuitry 234 may prompt the C/A bus interface 214 to relay commands issued by the memory interface circuitry 234 over the C/A bus 236 to a local controller in the non-volatile memory 206. And the memory interface circuitry 234 may transmit to, or receive data from, the non-volatile memory 206 over the data bus 232. In some examples, the commands issued by the memory interface circuitry 234 may be supported by the non-volatile memory 206 but not the volatile memory 204 (e.g., the commands issued by the memory interface circuitry 234 may be different than the commands issued by the memory interface circuitry 240).

The memory interface circuitry 240 may communicate with the volatile memory 204 via one or more of the data bus interface 216 and the C/A bus interface 264. For example, the memory interface circuitry 240 may prompt the C/A bus interface 264 to relay commands issued by the memory interface circuitry 240 over the C/A bus 242 to a local controller of the volatile memory 204. And the memory interface circuitry 240 may transmit to, or receive data from, the volatile memory 204 over one or more data buses 238. In some examples, the commands issued by the memory interface circuitry 240 may be supported by the volatile memory 204 but not the non-volatile memory 206 (e.g., the commands issued by the memory interface circuitry 240 may be different than the commands issued by the memory interface circuitry 234).

Together, the components of the interface controller 202 may operate the non-volatile memory 206 as a main memory and the volatile memory 204 as a cache. Such operation may be prompted by one or more access commands (e.g., read commands and write commands) received from a host device.

In some examples, the interface controller 202 may receive a write command from the host device. The write command may be received over the C/A bus 226 and transferred to the command circuitry 230 via one or more of the C/A bus interface 210 and the decoder 228. The write command may include or be accompanied by address bits that target a memory address of the non-volatile memory 206. The data to be written may be received over the data bus 260 and transferred to the buffer 218 via the data bus interface 208. In a write-through mode, the interface controller 202 may transfer the data to both the non-volatile memory 206 and the volatile memory 204. In a write-back mode, in some example, the interface controller 202 may transfer the data to only the volatile memory 204.

In either mode, the interface controller 202 may first check to see if the volatile memory 204 has space (e.g., available memory cells) to store the data. To do so, the command circuitry 230 may reference the metadata in the appropriate memory array 252 to determine whether one or more of the n addresses associated with the non-volatile memory address are empty (e.g., store random or invalid data) or whether one or more of the n addresses associated with the non-volatile memory address are full (e.g., store valid data). For example, the command circuitry 230 may determine whether one or more of the n addresses is available (or is unavailable) for writing based on tag information and validity information stored in the memory array 252. An address of the volatile memory 204 may be associated with a set of volatile memory cells which may be referred to as a line, cache line, cache block, or row.

If one of then associated addresses is available for writing, the interface controller 202 may transfer the data from the buffer 218 to the volatile memory 204 for storage at that address (e.g., in the set of associated volatile memory cells). But if none of then associated addresses are available, the interface controller 202 may initiate an eviction process to make room for the data in the volatile memory 204. The eviction process may involve transferring the victim data from one of the n associated addresses to the buffer 220. The dirty information for the victim data may be transferred from the memory array 254 to the register 258 for identification of dirty subsets of the victim data. After the victim data is stored in the buffer 220, the new data can be transferred from the buffer 218 to the volatile memory 204 and the victim data can be transferred from the buffer 220 to the non-volatile memory 206. In some cases, dirty subsets of the old data may be transferred to the non-volatile memory 206 and clean subsets (e.g., unmodified subsets) may be discarded. The dirty subsets may be identified by the engine 246-*b* based on or in response to dirty information transferred from the memory array 254 to the register 258 during the eviction process.

In another example, the interface controller 202 may receive a command, such as a read command, from the host device. The read command may be received over the C/A bus 226 and transferred to the command circuitry 230 via one or more of the C/A bus interface 210 and the decoder 228. The read command may include address bits that target a memory address of the non-volatile memory 206. Before attempting to access the targeted memory address of the non-volatile memory 206, the interface controller 202 may check to see if the volatile memory 204 stores the data. To do so, the command circuitry 230 may reference the metadata in the memory array 252 (e.g., using a set of the non-volatile memory address bits) to determine whether one or more of the n addresses associated with the non-volatile memory address stores the requested data. If the requested data is stored in the volatile memory 204, the interface controller 202 may transfer the requested data to the buffer 218 for transmission to the host device over the data bus 260.

If the requested data is not stored in the volatile memory 204 (e.g., the requested data may be stored in the non-volatile memory 206 or another location), the interface controller 202 may retrieve the data from the non-volatile memory 206 and transfer the data to the buffer 218 for transmission to the host device over the data bus 260. Additionally, the interface controller 202 may transfer the requested data from the buffer 218 to the volatile memory 204 so that the data can be accessed with a lower latency during a subsequent retrieval operation. Before transferring the requested data, however, the interface controller 202 may first determine whether one or more of the n associated addresses is available to store the requested data (e.g., whether one or more of the n associated addresses is empty or is full). The interface controller 202 may determine the availability of the n associated addresses by communicating with the related cache management circuit set. If an associated address is available, the interface controller 202 may transfer the data in the buffer 218 to the volatile memory 204 without performing an eviction process. Otherwise, the interface controller 202 may transfer the data from the buffer 218 to the volatile memory 204 after performing an eviction process.

The memory subsystem 200 may be implemented in one or more configurations, including one-chip versions and multi-chip versions. A multi-chip version may include one or more constituents of the memory subsystem 200, including the interface controller 202, the volatile memory 204, and the non-volatile memory 206 (among other constituents or combinations of constituents), on a chip that is separate from a chip that includes one or more other constituents of the memory subsystem 200. For example, in one multi-chip version, respective separate chips may include each of the interface controller 202, the volatile memory 204, and the non-volatile memory 206. In contrast, a one-chip version may include the interface controller 202, the volatile memory 204, and the non-volatile memory 206 on a single chip.

In some examples, a memory array 252 (or a memory array 254) may include or be coupled with one or more registers. For example, a memory array 252 may include or be coupled with a register for each bank of the volatile memory 204, and the memory array 254 may also include or be coupled with a register for each bank of the volatile memory 204. As described herein, the interface controller 202 may use the registers to store metadata from the array(s) so that the metadata can be updated without accessing the array(s) multiple times (and without performing multiple ECC operations), which may improve the power efficiency of the interface controller 202.

Figure 3:
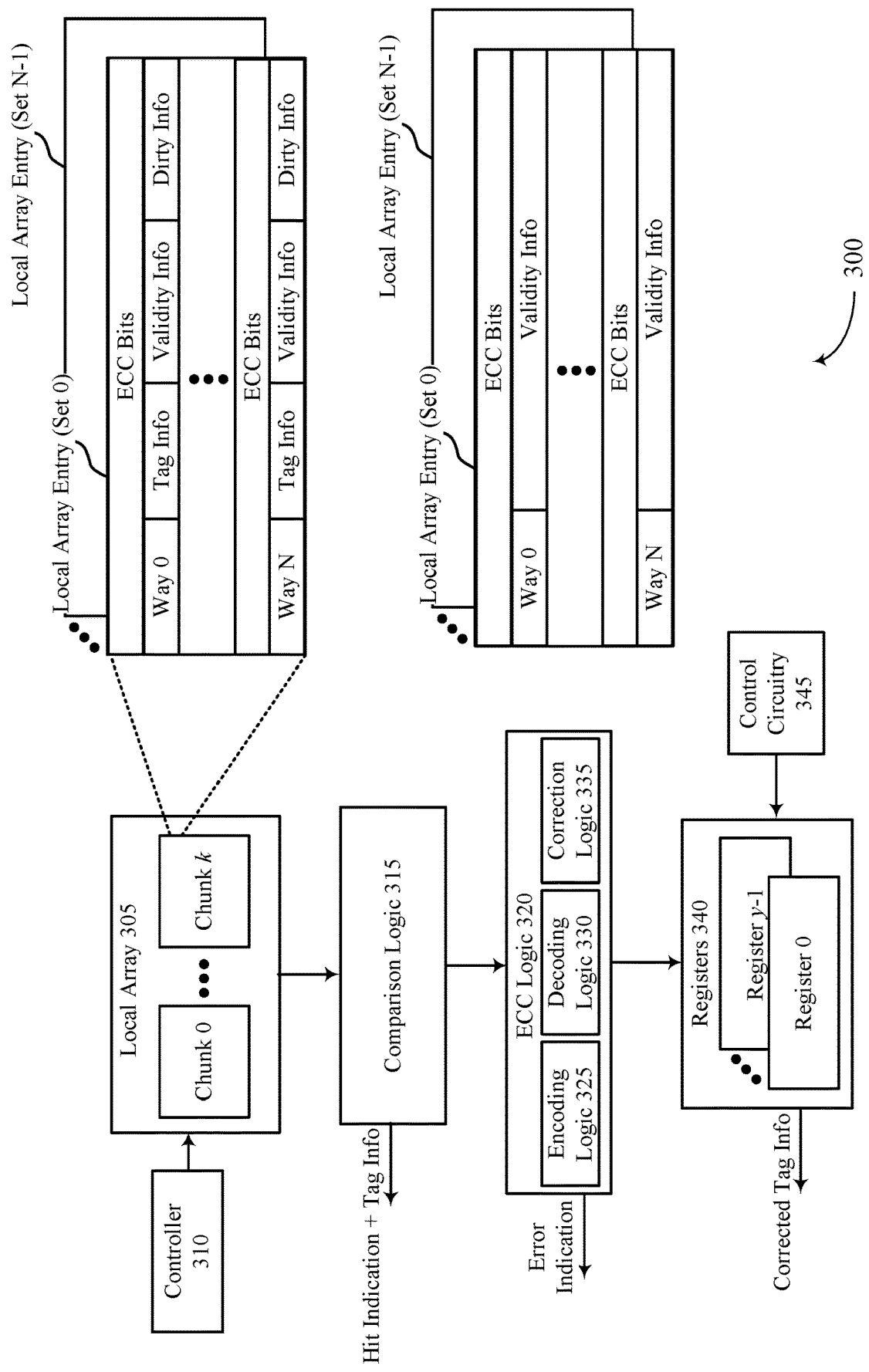
FIG. 3 illustrates an example of an interface controller that supports post ECC registers for cache metadata in accordance with examples as disclosed herein.

FIG. 3 illustrates an example of an interface controller 300 that supports post ECC registers for cache metadata in accordance with examples as disclosed herein. The interface controller 300 may be an example of an interface controller 115 as described with reference to FIG. 1 or an interface controller 202 as described with reference to FIG. 2. The interface controller 300 may include a local array 305, which may be an example of a memory array 252 or a memory array 254 as described with reference to FIG. 2. As described herein, the interface controller 300 may use registers to store metadata from the local array 305, which may improve the power consumption of the interface controller 300. Although shown with a single local array, the interface controller 300 may include any quantity of local arrays, which may be examples of memory arrays 252, memory arrays 254, or both.

The local array 305 may include multiple (e.g., k, where k is an integer) groups (e.g., chunks) of memory cells, each of which may store metadata for one or more banks of a volatile memory. For example, group 0 may store metadata for bank 0 and bank 1, group 1 may store metadata for bank 2 and bank 3, and so on and so forth. Each group may include an entry for a set of addresses of the volatile memory. Thus, there may be N entries for N sets of addresses. There may be n (e.g., 16) Ways in a set and each Way may correspond to a row address of the volatile memory. In some examples, each Way in a set may be identified by a Way index.

In the example where the local array 305 is a memory array 252, the local array 305 may store tag information (e.g., tag address bits) on a per-row basis, validity information on a per-row basis, and dirty information on a per-row basis, or according to other possible levels of granularity. Thus, the tag information for a Way may indicate the data stored in a row of the volatile memory, the validity information for the Way may indicate the validity status for the row, and the dirty information for the Way may indicate the dirty status for the row. The local array 305 may also include ECC bits for the metadata in the local array. In some examples, the local array 305 may also include replacement policy information for evicting data from the volatile memory. The upper expanded view of group k illustrates simplified entries for the example where the local array 305 is a memory array 252.

In the example where the local array 305 is a memory array 254, the local array 305 may store validity information on a per-sub-block basis or according to other possible levels of granularity. For example, the validity information for a Way may include validity information for 64B sub-blocks of data within the row. The local array 305 may also include ECC bits for the metadata in the local array 305. The lower expanded view of group k illustrates simplified entries for the example where the local array 305 is a memory array 254.

Thus, the local array 305 may store metadata for operating the volatile memory as a cache as well as ECC bits for the metadata. In some example, the local array 305 may be operated by a controller 310, which may be an example of a finite-state-machine. The controller 310 may issue control signals to the local array 305 so that the local array 305 performs aspects of the techniques described herein, such as reading and writing metadata and ECC bits. In some examples, the local array 305 may be or may include a static random access (SRAM) array. However, the local array 305 is not limited to SRAM and may be or may include a different type of array, such as DRAM, among other memory technologies.

The local array 305 may be coupled with comparison logic 315 which may be configured to compare tag information stored in the local array 305 with tag information from an incoming command, and in doing so may determine whether there is a hit or a miss for the command. If there is a hit, the comparison logic 315 may output an indication of the hit along with the tag information associated with the hit. The comparison logic 315 may also be configured to communicate metadata information (e.g., tag information) from the local array 305 to the ECC logic 320. The comparison logic 315 may, in some example, include one or more comparators (e.g., the comparison logic may include N comparators to compare the tag information for the N Ways in a set or any other quantity of comparators), among other options.

The ECC logic 320 may be coupled with the local array 305 (e.g., via the comparison logic 315) and the registers 340. The ECC logic 320 may be configured to perform ECC operations on metadata, such an ECC encoding and ECC decoding.

The ECC logic 320 may include encoding logic 325, decoding logic 330, and correction logic 335. The encoding logic 325 may be configured to perform ECC encoding on metadata (e.g., by applying an error-correction code to the metadata). The encoding logic 325 may output codewords (referred to as metadata codewords) that include the metadata and parity bits (also referred to as ECC bits) generated by the ECC encoding. The decoding logic 330 may be configured to perform ECC decoding on metadata codewords to detect errors in the metadata codewords. For example, the decoding logic 330 may use a metadata codeword and the error-correction code to generate syndrome bits that indicate the location of errors in the metadata codeword. The correction logic 335 may be coupled with the decoding logic 330 and may be configured to correct errors in a metadata codeword detected by the decoding logic 330. The ECC logic 320 may be configured to communicate indications of metadata errors to other components of the interface controller, such as command circuitry 230 or the schedulers 248.

The registers 340 may be configured to receive and store corrected metadata from the ECC logic 320. There may, in some examples, be one register 340 per bank of the volatile memory (e.g., the quantity of registers 340 may be equal to the quantity of banks in the volatile memory) and each register 340 may be configured to store metadata for a single bank associated with that register 340. For example, if there are y banks in the volatile memory there may be y registers 340 and each register 340 may store metadata for the bank corresponding to that register. The volatile memory may be prohibited from opening more than a single row at a time in a given bank, so having a register 340 per bank of the volatile memory may allow the interface controller 300 to efficiently manage metadata for the banks in parallel. The registers 340 may be controlled by control circuitry 345, which may issue control signals to the registers and supporting circuitry (e.g., access circuitry) to implement aspects of the techniques described herein. There may, in some other examples, be a different n register 340 per bank of the volatile memory (e.g., the quantity of registers 340 may be different than the quantity of banks in the volatile memory) and each register 340 may be configured to store metadata for one or more banks associated with that register 340. For example, if there are y banks in the volatile memory there may be z registers 340 and each register 340 may store metadata for one or more banks corresponding to that register.

If metadata is stored in the registers 340, the interface controller 300 may update the metadata based on or in response to commands from a host device. So, the interface controller 300 may save power by accessing the registers 340 to update metadata information, as opposed to other techniques that access the local array 305 to update metadata information. Additionally, updating the metadata in the registers 340 may allow the interface controller 300 to avoid performing multiple rounds of ECC operations on the metadata, which may reduce power consumption relative to other techniques that perform multiple rounds of ECC operations. If the registers 340 store corrected metadata, the registers 340 may communicate the corrected metadata to other components of the interface controller such as command circuitry 230 or the schedulers 248.

Thus, the interface controller 300 may use the registers 340 to store and update metadata, which may reduce power consumption at the interface controller relative to other techniques. Although shown with a single local array 305 and a single set of registers 340, the interface controller 300 may include multiple local arrays (e.g., a memory array 252 and a memory array 254) and a set of registers 340 per local array 305.

Figure 4:
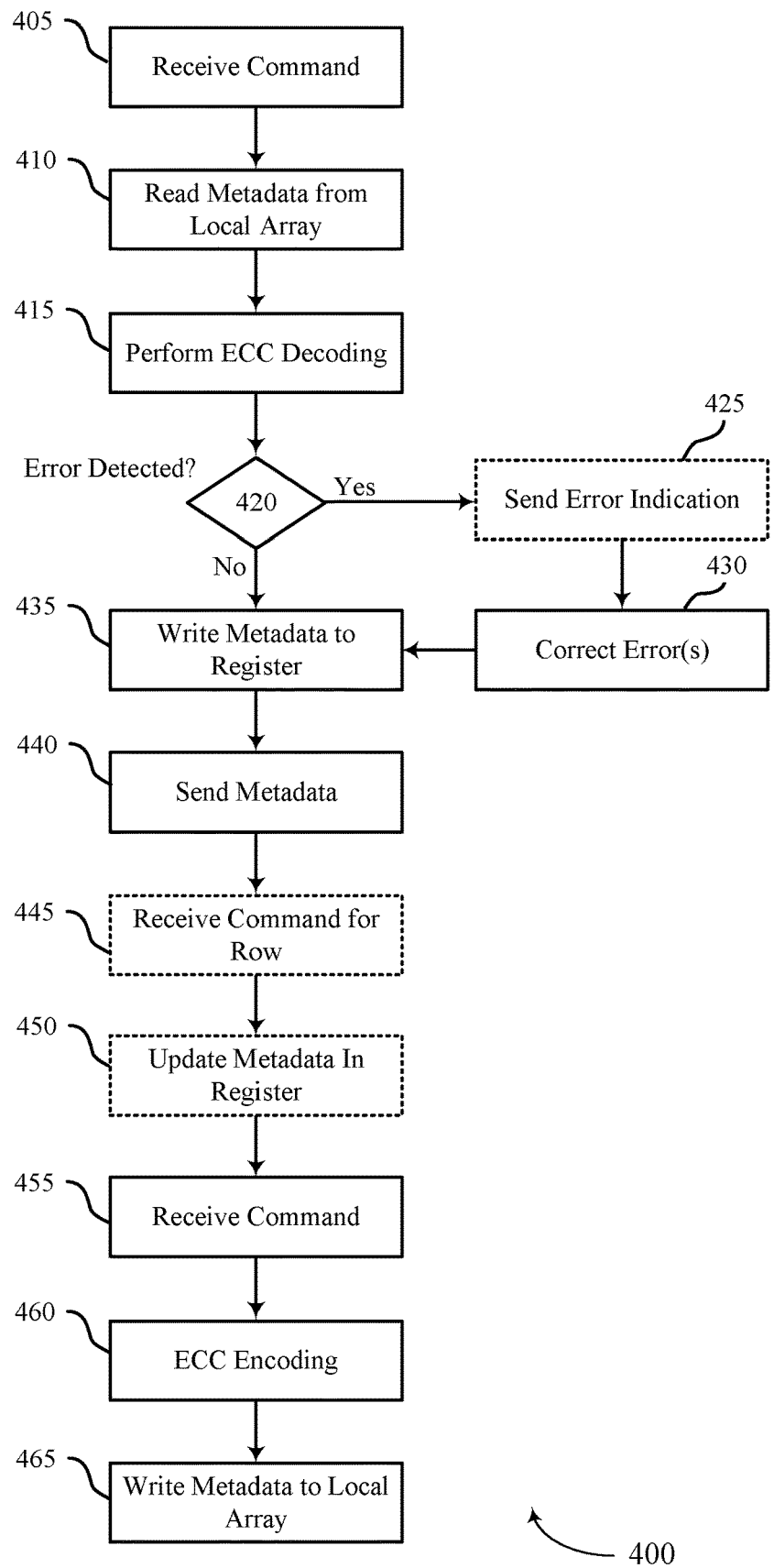
FIG. 4 illustrates an example of a process flow that supports post ECC registers for cache metadata in accordance with examples as disclosed herein.

FIG. 4 illustrates an example of a process flow 400 that supports post ECC registers for cache metadata in accordance with examples as disclosed herein. The process flow 400 may be implemented by a memory subsystem 110 or an interface controller 115 as described with reference to FIG. 1, a memory subsystem 200 or an interface controller 202 as described with reference to FIG. 2, or an interface controller 300 as described with reference to FIG. 3. However, other types of devices or components (or combinations thereof) may implement the process flow 400. The process flow 400 may illustrate the operations of a device that uses registers to store and manage metadata for a volatile memory that is operated as a cache for a non-volatile memory.

For ease of reference, the process flow 400 is described with reference to a device. For example, aspects of the process flow 400 may be implemented by a device that includes a volatile memory and a non-volatile memory. Additionally or alternatively, aspects of the process flow 400 may be implemented as instructions stored in memory (e.g., firmware stored in the volatile memory 120 or the non-volatile memory 125 or both). For example, the instructions, if executed by a controller, may cause the controller to perform the operations of the process flow 400.

At 405, a command, such as an activate (ACT) command, may be received from a host device. For example, the interface controller 300 may receive an activate command for a row of a bank of the volatile memory. A row may be a set of memory cells that share a common word line. The activate command may prompt the interface controller 300 to activate (e.g., open) the row. In some examples, the activate command issued by the host device may be used to open a row considering host media characteristics of a memory protocol, such as LPDDR5. In such examples, the host device may be unaware of the bank-row structure of volatile memory and non-volatile memory. Thus, the interface controller 300 may map an activate command from the host device to the bank-row structure of the volatile memory, the non-volatile memory, or both.

At 410, metadata may be read from a local array. For example, the interface controller 300 may read metadata associated with the activate command from a local array 305, which may be an example of a memory array 252 or a memory array 254. The interface controller 300 may also read parity bits for the metadata from the local array 305. At 415, ECC decoding may be performed on the metadata (or more specifically, ECC decoding may be performed on the metadata codeword that includes the metadata and the parity bits for the metadata). The interface controller 300 may communicate the metadata from the local array 305 to the ECC logic 320 so that the decoding logic 330 can perform ECC decoding on the metadata.

At 420, it may be determined whether an error in the metadata. For example, the interface controller 300 may determine whether there is in error in the metadata based on or in response to the ECC decoding. If, at 420, it is determined that there is an error in the metadata, the process flow 400 may proceed to 435. If, at 420, it is determined that there is an error in the metadata, the process flow 400 may proceed to 425.

At 425, an error indication may be sent. For example, the interface controller 300 may (e.g., via the ECC logic) send an error indication to one or more other components of the interface controller 300, such as a controller (e.g., the command circuitry 230), a scheduler 248, or both. Sending an indication of the error may prevent the other component(s) from using the uncorrected metadata (which be sent to the other components between 410 and 415) for cache management. At 430, error correction may occur. For example, the interface controller 300 may (e.g., via the correction logic 335) correct one or more correctable errors in the metadata. If the error(s) in the metadata are uncorrectable, the interface controller 300 may send an indication of the uncorrectable errors to one or more other components of the interface controller 300.

At 435, the metadata may be written to a register. For example, the interface controller 300 may write the metadata to the register 340 that corresponds to the bank indicated by the activate command. The metadata written to the register may be received by the register from the ECC logic 320 (possibly after error correction if an error is detected at 420).

At 440, the metadata may be sent to one or more components of the interface controller 300. For example, the interface controller 300 may send the metadata written in the register to the command circuitry 230, a scheduler 248, or both. The interface controller 300 may send the metadata from the register so that the other components can use the corrected version of the metadata in place of the metadata that was sent (e.g., for latency purposes) from the comparison logic 315 after reading the metadata from the local array 305. The other components may replace the previously sent metadata with the corrected metadata based on or in response to the error indication sent at 425.

At 445, a command may be received for the row of the bank. For example, the interface controller 300 may receive a read command or a write command for the row of the bank. At 450, the metadata in the register may be updated. For example, the interface controller 300 may update the metadata in the register based on or in response to the command received at 445. By updating the metadata in the register, the interface controller 300 may conserve power that would otherwise be expended accessing the local array 305 and performing an additional ECC operation on the metadata.

At 455, a command, such as a pre-charge (PRE) command, may be received. For example, the interface controller 300 may receive a pre-charge command for the row of the bank of the volatile memory. The pre-charge command may prompt the interface controller 300 to deactivate (e.g., close) the row. In some examples, the pre-charge command issued by the host device may be used to close a row considering host media characteristics of a memory protocol, such as LPDDR5. In such examples, the host device may be unaware of the bank-row structure of volatile memory and non-volatile memory. Thus, the interface controller 300 may map a pre-charge command from the host device to the bank-row structure of the volatile memory, the non-volatile memory, or both.

At 460, ECC encoding may be performed. For example, the interface controller 300 may (e.g., via the encoding logic 325) apply an error correction code to the metadata to generate a metadata codeword that includes the metadata and parity bits for the metadata. The interface controller 300 may communicate the metadata from the register to the ECC logic 320 based on or in response the pre-charge command. At 465, the metadata (or more specifically, the metadata codeword) may be written to the local array 305.

Although described with reference to a single local array 305, the process flow 400 may include additional operations for a second local array 305 that are similar to the operations 405 through 465 and that occur in parallel (e.g., at least partially overlapping times) with the operations 405 through 465. Alternative examples of the foregoing may be implemented, where some operations are performed in a different order than described, are performed in parallel, or are not performed at all. In some cases, operations may include additional features not mentioned herein, or further operations may be added. Additionally, certain operations may be performed multiple times or certain combinations of operations may repeat or cycle.

Figure 5:
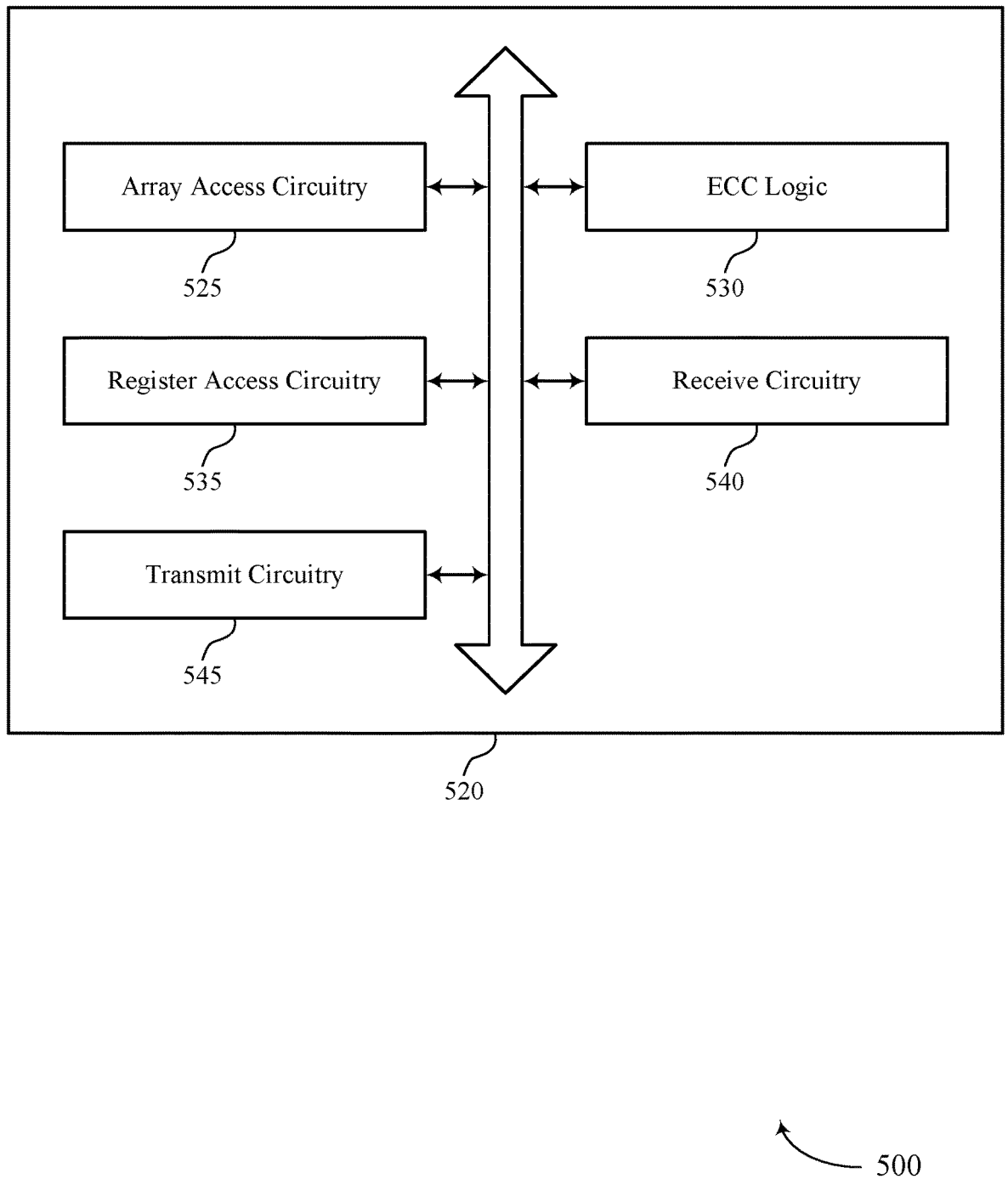
FIG. 5 shows a block diagram of a device that supports post ECC registers for cache metadata in accordance with examples as disclosed herein.

FIG. 5 shows a block diagram 500 of a device 520 that supports post ECC registers for cache metadata in accordance with examples as disclosed herein. The device 520 may be an example of aspects of a device as described with reference to FIGS. 1 through 4. The device 520, or various components thereof, may be an example of means for performing various aspects of post error correction code registers for cache metadata as described herein. For example, the device 520 may include an array access circuitry 525, a ECC logic 530, a register access circuitry 535, a receive circuitry 540, a transmit circuitry 545, or any combination thereof. Each of these components may communicate, directly or indirectly, with one another (e.g., via one or more buses).

The array access circuitry 525 may be configured as or otherwise support a means for reading metadata from a memory array included in an interface controller coupled with volatile memory and a non-volatile memory, the metadata including information for operating the volatile memory as a cache for the non-volatile memory. The ECC logic 530 may be configured as or otherwise support a means for performing an ECC operation on the metadata based at least in part on reading the metadata from the memory array. The register access circuitry 535 may be configured as or otherwise support a means for writing, based at least in part on performing the ECC operation, the metadata to a register that is coupled with the memory array. In some examples, the array access circuitry 525 may be configured as or otherwise support a means for writing the metadata from the register to the memory array.

In some examples, the receive circuitry 540 may be configured as or otherwise support a means for receiving an activate command for a row of a bank in the volatile memory, where the metadata is read from the memory array based at least in part on the activate command. In some examples, the receive circuitry 540 may be configured as or otherwise support a means for receiving a precharge command for the row of the bank in the volatile memory, where the metadata is written to the memory array based at least in part on the precharge command.

In some examples, the receive circuitry 540 may be configured as or otherwise support a means for receiving a read command or a write command for the row after receiving the activate command. In some examples, the register access circuitry 535 may be configured as or otherwise support a means for updating the metadata in the register based at least in part on the read command or the write command.

In some examples, the receive circuitry 540 may be configured as or otherwise support a means for determining the bank, of the memory array, that is associated with the metadata based at least in part on the activate command, where the metadata is written to the register based at least in part on the register being configured for the bank.

In some examples, the array access circuitry 525 may be configured as or otherwise support a means for reading parity bits for the metadata from the memory array, where the ECC operation is performed based at least in part on the parity bits for the metadata. In some examples, the ECC logic 530 may be configured as or otherwise support a means for decoding, as part of the ECC operation, a codeword including the parity bits and the metadata. In some examples, the ECC logic 530 may be configured as or otherwise support a means for detecting an error in the metadata based at least in part on decoding the codeword.

In some examples, the ECC logic 530 may be configured as or otherwise support a means for detecting an error in the metadata based at least in part on the ECC operation. In some examples, the ECC logic 530 may be configured as or otherwise support a means for correcting the error detected in the metadata based at least in part on detecting the error, where the metadata is written to the register after correcting the error.

In some examples, the transmit circuitry 545 may be configured as or otherwise support a means for sending an indication of the error to a controller included in the interface controller, the controller for managing commands for the volatile memory and commands for the non-volatile memory. In some examples, the transmit circuitry 545 may be configured as or otherwise support a means for sending the corrected metadata to the controller after sending the indication of the error.

In some examples, the metadata is associated with a first bank of the memory array, and the array access circuitry 525 may be configured as or otherwise support a means for reading second metadata from the memory array, the second metadata associated with a second bank of the memory array. In some examples, the metadata is associated with a first bank of the memory array, and the register access circuitry 535 may be configured as or otherwise support a means for writing, based at least in part on performing a second ECC operation on the second metadata, the second metadata to a second register that is coupled with the memory array.

Figure 6:
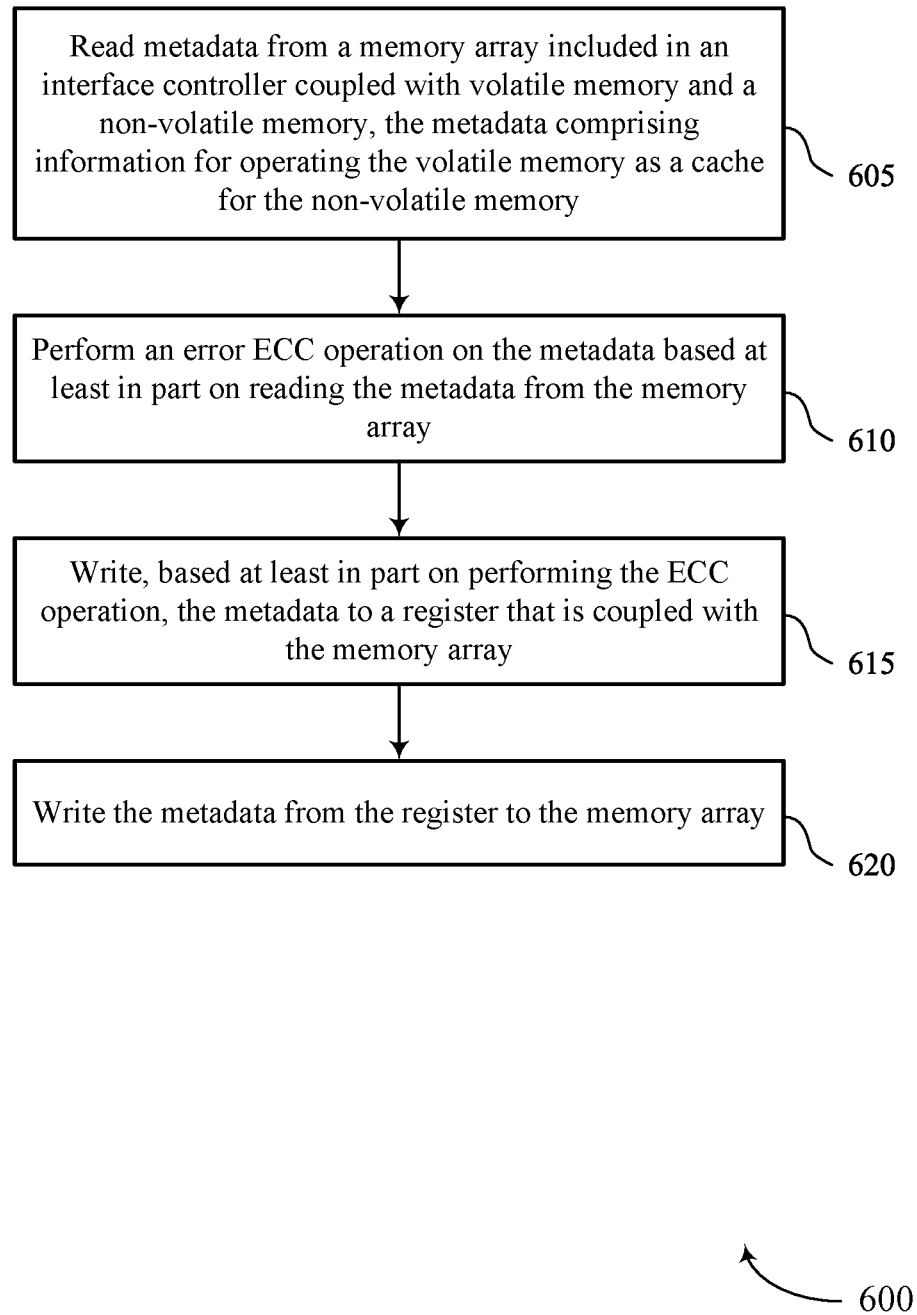
FIG. 6 shows a flowchart illustrating a method or methods that support post ECC registers for cache metadata in accordance with examples as disclosed herein.

FIG. 6 shows a flowchart illustrating a method 600 that supports post ECC registers for cache metadata in accordance with examples as disclosed herein. The operations of method 600 may be implemented by a device or its components as described herein. For example, the operations of method 600 may be performed by a device as described with reference to FIGS. 1 through 5. In some examples, a device may execute a set of instructions to control the functional elements of the device to perform the described functions. Additionally or alternatively, the device may perform aspects of the described functions using special-purpose hardware.

At 605, the method may include reading metadata from a memory array included in an interface controller coupled with volatile memory and a non-volatile memory, the metadata including information for operating the volatile memory as a cache for the non-volatile memory. The operations of 605 may be performed in accordance with examples as disclosed herein. In some examples, aspects of the operations of 605 may be performed by an array access circuitry 525 as described with reference to FIG. 5.

At 610, the method may include performing an ECC operation on the metadata based at least in part on reading the metadata from the memory array. The operations of 610 may be performed in accordance with examples as disclosed herein. In some examples, aspects of the operations of 610 may be performed by a ECC logic 530 as described with reference to FIG. 5.

At 615, the method may include writing, based at least in part on performing the ECC operation, the metadata to a register that is coupled with the memory array. The operations of 615 may be performed in accordance with examples as disclosed herein. In some examples, aspects of the operations of 615 may be performed by a register access circuitry 535 as described with reference to FIG. 5.

At 620, the method may include writing the metadata from the register to the memory array. The operations of 620 may be performed in accordance with examples as disclosed herein. In some examples, aspects of the operations of 620 may be performed by an array access circuitry 525 as described with reference to FIG. 5.

In some examples, an apparatus as described herein may perform a method or methods, such as the method 600. The apparatus may include, features, circuitry, logic, means, or instructions (e.g., a non-transitory computer-readable medium storing instructions executable by a processor) for reading metadata from a memory array included in an interface controller coupled with volatile memory and a non-volatile memory, the metadata including information for operating the volatile memory as a cache for the non-volatile memory, performing an ECC operation on the metadata based at least in part on reading the metadata from the memory array, writing, based at least in part on performing the ECC operation, the metadata to a register that is coupled with the memory array, and writing the metadata from the register to the memory array.

Some examples of the method 600 and the apparatus described herein may further include operations, features, circuitry, logic, means, or instructions for receiving an activate command for a row of a bank in the volatile memory, where the metadata may be read from the memory array based at least in part on the activate command.

Some examples of the method 600 and the apparatus described herein may further include operations, features, circuitry, logic, means, or instructions for receiving a precharge command for the row of the bank in the volatile memory, where the metadata may be written to the memory array based at least in part on the precharge command.

Some examples of the method 600 and the apparatus described herein may further include operations, features, circuitry, logic, means, or instructions for receiving a read command or a write command for the row after receiving the activate command and updating the metadata in the register based at least in part on the read command or the write command.

Some examples of the method 600 and the apparatus described herein may further include operations, features, circuitry, logic, means, or instructions for determining the bank, of the memory array, that may be associated with the metadata based at least in part on the activate command, where the metadata may be written to the register based at least in part on the register being configured for the bank.

Some examples of the method 600 and the apparatus described herein may further include operations, features, circuitry, logic, means, or instructions for reading parity bits for the metadata from the memory array, where the ECC operation may be performed based at least in part on the parity bits for the metadata.

Some examples of the method 600 and the apparatus described herein may further include operations, features, circuitry, logic, means, or instructions for decoding, as part of the ECC operation, a codeword including the parity bits and the metadata and detecting an error in the metadata based at least in part on decoding the codeword.

Some examples of the method 600 and the apparatus described herein may further include operations, features, circuitry, logic, means, or instructions for detecting an error in the metadata based at least in part on the ECC operation and correcting the error detected in the metadata based at least in part on detecting the error, where the metadata may be written to the register after correcting the error.

Some examples of the method 600 and the apparatus described herein may further include operations, features, circuitry, logic, means, or instructions for sending an indication of the error to a controller included in the interface controller, the controller for managing commands for the volatile memory and commands for the non-volatile memory and sending the corrected metadata to the controller after sending the indication of the error.

In some examples of the method 600 and the apparatus described herein, the metadata may be associated with a first bank of the memory array and the method, apparatuses, and non-transitory computer-readable medium may include further operations, features, circuitry, logic, means, or instructions for reading second metadata from the memory array, the second metadata associated with a second bank of the memory array and writing, based at least in part on performing a second ECC operation on the second metadata, the second metadata to a second register that may be coupled with the memory array.

It should be noted that the methods described herein describe possible implementations, and that the operations and the steps may be rearranged or otherwise modified and that other implementations are possible. Further, portions from two or more of the methods may be combined.

An apparatus is described. The apparatus may include a non-volatile memory, a volatile memory, and an interface controller coupled with the non-volatile memory and the volatile memory, the interface controller operable to cause the apparatus to read metadata from a memory array included in the interface controller, the metadata including information for operating the volatile memory as a cache for the non-volatile memory, perform an ECC operation on the metadata based at least in part on reading the metadata from the memory array, write, based at least in part on performing the ECC operation, the metadata to a register that is coupled with the memory array, and write the metadata from the register to the memory array.

In some examples, the apparatus may include receive an activate command for a row of a bank in the volatile memory, where the metadata may be read from the memory array based at least in part on the activate command. In some examples, the apparatus may include receive a precharge command for the row of the bank in the volatile memory, where the metadata may be written to the memory array based at least in part on the precharge command.

In some examples, the apparatus may include receive a read command or a write command for the row after receiving the activate command and update the metadata in the register based at least in part on the read command or the write command. In some examples, the apparatus may include determine the bank, of the memory array, that may be associated with the metadata based at least in part on the activate command, where the metadata may be written to the register based at least in part on the register being configured for the bank.

In some examples, the apparatus may include read parity bits for the metadata from the memory array, where the ECC operation may be performed based at least in part on the parity bits for the metadata. In some examples of the apparatus, the interface controller may be operable to cause the apparatus to decode, as part of the ECC operation, a codeword including the parity bits and the metadata and detect an error in the metadata based at least in part on decoding the codeword.

In some examples, the apparatus may include detect an error in the metadata based at least in part on the ECC operation and correct the error detected in the metadata based at least in part on detecting the error, where the metadata may be written to the register after correcting the error. In some examples, the apparatus may include send an indication of the error to a controller included in the interface controller, the controller configured to manage commands for the volatile memory and commands for the non-volatile memory and send the corrected metadata to the controller after sending the indication of the error.

In some examples, the apparatus may include read second metadata from the memory array, the second metadata associated with a second bank of the memory array and write, based at least in part on performing a second ECC operation on the second metadata, the second metadata to a second register that may be coupled with the memory array.

Another apparatus is described. The apparatus may include a non-volatile memory, a volatile memory configured to operate as a cache for the non-volatile memory, and an interface controller coupled with the non-volatile memory and the volatile memory, the interface controller including an SRAM array configured to store metadata for operating the volatile memory as the cache, ECC logic coupled with the SRAM array and configured to perform an ECC operation on the metadata from the SRAM array, and a register, for a bank of the volatile memory, coupled with the ECC logic and configured to store metadata from the ECC logic, where interface controller is configured to update the metadata in the register and communicate the metadata from the register to the SRAM array.

In some examples of the apparatus, the interface controller includes a set of registers coupled with the ECC logic, and the set of registers includes the register and each register in the set of registers may be associated with a respective bank of the volatile memory. In some examples, the apparatus may include a controller coupled with the register and configured to control operations of the register.

In some examples of the apparatus, the interface controller may be configured to communicate the metadata from the SRAM array to the ECC logic, and the interface controller may be configured to communicate the metadata from the ECC logic to the register. In some examples of the apparatus, the interface controller may be configured to communicate the metadata from the SRAM array to the ECC logic based at least in part on an activate command for a row of the bank, and the interface controller may be configured to communicate the metadata from the register to the SRAM array based at least in part on a precharge command for the row of the bank.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

A protocol may define one or more communication procedures and one or more communication parameters supported for use by a device or component. For example, a protocol may define various operations, a timing and a frequency for those operations, a meaning of various commands or signals or both, one or more addressing scheme(s) for one or more memories, a type of communication for which pins are reserved, a size of data handled at various components such as interfaces, a data rate supported by various components such as interfaces, or a bandwidth supported by various components such as interfaces, among other parameters and metrics, or any combination thereof. Use of a shared protocol may enable interaction between devices because each device may operate in a manner expected, recognized, and understood by another device. For example, two devices that support the same protocol may interact according to the policies, procedures, and parameters defined by the protocol, whereas two devices that support different protocols may be incompatible.

To illustrate, two devices that support different protocols may be incompatible because the protocols define different addressing schemes (e.g., different quantities of address bits). As another illustration, two devices that support different protocols may be incompatible because the protocols define different transfer procedures for responding to a single command (e.g., the burst length or quantity of bytes permitted in response to the command may differ). Merely translating a command to an action should not be construed as use of two different protocols. Rather, two protocols may be considered different if corresponding procedures or parameters defined by the protocols vary. For example, a device may be said to support two different protocols if the device supports different addressing schemes, or different transfer procedures for responding to a command.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on or in response to the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, the term "substantially" means that the modified characteristic (e.g., a verb or adjective modified by the term substantially) need not be absolute but is close enough to achieve the advantages of the characteristic. As used herein, the term "concurrently" means that the described actions or phenomena occur during durations that at least partially overlap in time, that can occur at substantially the same time or be offset in time. As used herein, a "set" of objects may refer to one or more of the objects unless otherwise described or noted.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a non-volatile memory;
a volatile memory; and
an interface controller coupled with the non-volatile memory and the volatile memory, the interface controller operable to cause the apparatus to:
read metadata from a volatile memory array included in the interface controller, the metadata associated with operating the volatile memory as a cache for the non-volatile memory;
perform an error correction code (ECC) decoding operation on the metadata based at least in part on reading the metadata from the volatile memory array;
write, based at least in part on performing the ECC decoding operation, the metadata or corrected metadata to a register that is coupled with the volatile memory array; and
write the metadata or the corrected metadata from the register to the volatile memory array.

2. The apparatus of claim 1, wherein the interface controller is operable to cause the apparatus to:
receive an activate command for a row of a bank in the volatile memory, wherein the metadata is read from the volatile memory array based at least in part on the activate command.

3. The apparatus of claim 2, wherein the interface controller is operable to cause the apparatus to:
receive a precharge command for the row of the bank in the volatile memory, wherein the metadata or the corrected metadata is written to the volatile memory array based at least in part on the precharge command.

4. The apparatus of claim 2, wherein the interface controller is operable to cause the apparatus to:
receive a read command or a write command for the row after receiving the activate command; and
update the metadata or the corrected metadata in the register based at least in part on the read command or the write command.

5. The apparatus of claim 2, wherein the interface controller is operable to cause the apparatus to:
determine the bank, of the volatile memory array, that is associated with the metadata based at least in part on the activate command, wherein the metadata or the corrected metadata is written to the register based at least in part on the register being configured for the bank.

6. The apparatus of claim 1, wherein the interface controller is operable to cause the apparatus to:
read parity bits for the metadata from the volatile memory array, wherein the ECC decoding operation is performed based at least in part on the parity bits for the metadata.

7. The apparatus of claim 6, wherein the interface controller is operable to cause the apparatus to:
decode, as part of the ECC decoding operation, a codeword comprising the parity bits and the metadata; and detect an error in the metadata based at least in part on decoding the codeword.

8. The apparatus of claim 1, wherein the interface controller is operable to cause the apparatus to:
   detect an error in the metadata based at least in part on the ECC decoding operation; and
   correct the error detected in the metadata based at least in part on detecting the error, wherein the corrected metadata is written to the register after correcting the error.

9. The apparatus of claim 8, wherein the interface controller is operable to cause the apparatus to:
   send an indication of the error to a controller included in the interface controller, the controller configured to manage commands for the volatile memory and commands for the non-volatile memory; and
   send the corrected metadata to the controller after sending the indication of the error.

10. The apparatus of claim 1, wherein the metadata is associated with a first bank of the volatile memory array, and wherein the interface controller is operable to cause the apparatus to:
    read second metadata from the volatile memory array, the second metadata associated with a second bank of the volatile memory array; and
    write, based at least in part on performing a second ECC decoding operation on the second metadata, the second metadata or second corrected metadata to a second register that is coupled with the volatile memory array.

11. A method, comprising:
    reading metadata from a volatile memory array included in an interface controller coupled with volatile memory and a non-volatile memory, the metadata associated with operating the volatile memory as a cache for the non-volatile memory;
    performing an error correction code (ECC) decoding operation on the metadata based at least in part on reading the metadata from the volatile memory array;
    writing, based at least in part on performing the ECC decoding operation, the metadata or corrected metadata to a register that is coupled with the volatile memory array; and
    writing the metadata or the corrected metadata from the register to the volatile memory array.

12. The method of claim 11, further comprising:
    receiving an activate command for a row of a bank in the volatile memory, wherein the metadata is read from the volatile memory array based at least in part on the activate command.

13. The method of claim 12, further comprising:
    receiving a precharge command for the row of the bank in the volatile memory, wherein the metadata or the corrected metadata is written to the volatile memory array based at least in part on the precharge command.

14. The method of claim 12, further comprising:
    receiving a read command or a write command for the row after receiving the activate command; and
    updating the metadata or the corrected metadata in the register based at least in part on the read command or the write command.

15. The method of claim 12, further comprising:
    determining the bank, of the volatile memory array, that is associated with the metadata based at least in part on the activate command, wherein the metadata or the corrected metadata is written to the register based at least in part on the register being configured for the bank.

16. The method of claim 11, further comprising:
    reading parity bits for the metadata from the volatile memory array, wherein the ECC decoding operation is performed based at least in part on the parity bits for the metadata.

17. The method of claim 16, further comprising:
    decoding, as part of the ECC decoding operation, a codeword comprising the parity bits and the metadata; and
    detecting an error in the metadata based at least in part on decoding the codeword.

18. The method of claim 11, further comprising:
    detecting an error in the metadata based at least in part on the ECC decoding operation; and
    correcting the error detected in the metadata based at least in part on detecting the error, wherein the corrected metadata is written to the register after correcting the error.

19. The method of claim 18, further comprising:
    sending an indication of the error to a controller included in the interface controller, the controller for managing commands for the volatile memory and commands for the non-volatile memory; and
    sending the corrected metadata to the controller after sending the indication of the error.

20. The method of claim 11, wherein the metadata is associated with a first bank of the volatile memory array, the method further comprising:
    reading second metadata from the volatile memory array, the second metadata associated with a second bank of the volatile memory array; and
    writing, based at least in part on performing a second ECC decoding operation on the second metadata, the second metadata or second corrected metadata to a second register that is coupled with the volatile memory array.

21. An apparatus, comprising:
    a non-volatile memory;
    a volatile memory configured to operate as a cache for the non-volatile memory; and
    an interface controller coupled with the non-volatile memory and the volatile memory, the interface controller comprising:
      a static random access memory (SRAM) array configured to store metadata associated with operating the volatile memory as the cache;
      error correction code (ECC) logic coupled with the SRAM array and configured to perform an ECC decoding operation on the metadata from the SRAM array; and
      a register, for a bank of the volatile memory, coupled with the ECC logic and configured to store metadata or corrected metadata from the ECC logic, wherein the interface controller is configured to update the metadata or the corrected metadata in the register and communicate the metadata or the corrected metadata from the register to the SRAM array.

22. The apparatus of claim 21, wherein the interface controller comprises a set of registers coupled with the ECC logic, and wherein the set of registers includes the register and each register in the set of registers is associated with a respective bank of the volatile memory.

23. The apparatus of claim 21, further comprising:
    a controller coupled with the register and configured to control operations of the register.

24. The apparatus of claim 21, wherein the interface controller is configured to communicate the metadata from the SRAM array to the ECC logic, and wherein the interface controller is configured to communicate the metadata or the corrected metadata from the ECC logic to the register.

25. The apparatus of claim 24, wherein the interface controller is configured to communicate the metadata from the SRAM array to the ECC logic based at least in part on an activate command for a row of the bank, and wherein the interface controller is configured to communicate the metadata or the corrected metadata from the register to the SRAM array based at least in part on a precharge command for the row of the bank.

* * * * *